United States Patent [19]
Dahn et al.

[11] Patent Number: 5,900,385
[45] Date of Patent: May 4, 1999

[54] NICKEL—CONTAINING COMPOUNDS USEFUL AS ELECTRODES AND METHOD FOR PREPARING SAME

[75] Inventors: Jeffrey R. Dahn, Hubley, Canada; Tao Zheng, Eatontown, N.J.

[73] Assignee: Minnesota Mining and Manufacturing Company, St. Paul, Minn.

[21] Appl. No.: 08/950,628

[22] Filed: Oct. 15, 1997

[51] Int. Cl.$^6$ .............................. B01J 23/00; B01J 23/32; H01M 4/32

[52] U.S. Cl. ......................... 502/302; 502/313; 502/315; 502/325; 502/350; 502/324; 502/337; 502/344; 502/524; 502/525; 429/231.5; 429/223; 429/224; 429/231.1; 252/519.15; 423/596

[58] Field of Search ..................................... 502/101, 305, 502/313, 315, 317, 319, 324, 325, 330, 337, 344, 524, 525; 429/231.5, 223, 224, 231.1; 252/519.15; 423/596

[56] References Cited

U.S. PATENT DOCUMENTS

| | | | |
|---|---|---|---|
| 3,216,954 | 11/1965 | Howk et al. | 502/524 |
| 4,008,181 | 2/1977 | Dorawala et al. | 502/315 |
| 4,134,852 | 1/1979 | Volin | 502/524 |
| 4,567,031 | 1/1986 | Riley | 423/593 |
| 4,812,300 | 3/1989 | Quinlan et al. | 502/525 |
| 5,051,156 | 9/1991 | Scharifker et al. | 502/315 |
| 5,084,366 | 1/1992 | Toyoguchi | 429/224 |
| 5,370,949 | 12/1994 | Davidson et al. | 429/224 |
| 5,523,500 | 6/1996 | Cheminal et al. | 502/315 |
| 5,540,741 | 7/1996 | Gozdz et al. | 29/623.5 |
| 5,609,975 | 3/1997 | Hasegawa et al. | 429/217 |
| 5,691,263 | 11/1997 | Park et al. | 502/344 |
| 5,728,644 | 3/1998 | Ho et al. | 502/315 |
| 5,759,947 | 6/1998 | Zhou | 502/315 |
| 5,789,112 | 8/1998 | Ellgen | 429/223 |

FOREIGN PATENT DOCUMENTS

| | | |
|---|---|---|
| 0624552 A1 | 11/1994 | European Pat. Off. . |
| 808 7998 | 4/1996 | Japan . |
| 8298111 | 11/1996 | Japan . |

OTHER PUBLICATIONS

Nagaura et al., "Lithium Ion Rechargeable Battery", *Progress in Batteries and Solar Cells*, vol. 9, pp. 209–217 (1990). Month, N/A.

Dahn et al., "Rechargeable LiNiO$_2$/Carbon Cells", *J. Electrochem. Soc.*, vol. 138, pp. 2207–2211 Aug. (1991).

Ohzuku et al., "Electrochemistry of Manganese Dioxide in Lithium Nonaqueous Cell", *J. Electrochem. Soc.*, vol. 137, pp. 769–775 (1990).

Reid, M., "Manganese Dioxide Rechargeable Lithium–Ion Battery", paper presented at Power '96, Santa Clara, California, Oct. 13–15, 1996, (9 pages).

Reimers et al., "Electrochemical and In Situ X–ray Diffraction Studies of Lithium Intercalation in Li CoO", *J. Electrochem. Soc.*, vol. 139, pp. 2091–2097 (1992). Month N/A.

Dahn et al., "Structure and Electrochemistry of Li$_{1+y}$NiO$_2$ and a New Li$_2$NiO$_2$ Phase with the Ni(OH) Structure", *Solid State Ionics*, vol. 44, pp. 87–97 Jul. (1990).

Gao et al., "Synthesis and Characterization of Li$_{1+x}$Mn$_{2-x}$O$_4$ for Li–Ion Battery Applications", *J. Electrochem. Soc.*, vol. 143, pp. 100–114 (Jan. 1996).

Gummow et al., "Improved Capacity Retention in Rechargeable 4 V Lithium/Lithium–Manganese Oxide (Spinel) Cells", *Solid State Ionics*, vol. 69, pp. 59–67 Feb. (1994).

Ohzuku et al., "LiMnO$_2$ As Cathode for Secondary Lithium Cell", *Chemistry Express*, vol. 7, pp. 193–196 (1992). Month N/A.

Reimers et al., "Synthesis and Electrochemical Studies of LiMnO$_2$ Prepared at Low Temperatures", *J. Electrochem. Soc.*, vol. 140, pp. 3396–3401 Dec. (1993).

Koetschau et al., "Orthorhombic LiMnO$_2$ as a High Capacity Cathode for Li–Ion Cells", *J. Electrochem. Soc.*, vol. 142, pp. 2906–2910 Sep. (1995).

Davidson et al., "Rechargeable Cathodes Based on Li$_2$Cr$_x$Mn$_{2-x}$O$_4$", *J. Power Sources*, vol. 54, pp. 205–208 (1995). Month N/A.

David et al., "Structure Refinement of the Spinel–Related Phases of Li$_2$Mn$_2$O$_4$ and Li$_{0.2}$Mn$_2$O$_4$", *J. Solid State Chemistry*, vol. 67, pp. 316–323 (1987). Jun. 1986.

Amine et al., "A New Three–Volt Spinel Li$_{1+x}$Mn$_{1.5}$Ni$_{0.5}$O$_4$ for Secondary Lithium Batteries", *J. Electrochem. Soc.*, vol. 143, pp. 1607–1613 (1996). Month N/A.

Richard et al., "A Cell for In Situ X–Ray Diffraction Based on Coin Cell Hardware and Bellcore Plastic Electrode Technology", *J. Electrochem. Soc.*, vol. 144, pp. 554–557 (1997). Month N/A.

Li et al., "Lattice–Gas Model Approach to Understanding the Structures of Lithium Transition–Metal Oxides LiMO$_2$", *Physical Review*, vol. 49, pp. 826–831 (1994). Jul. 1993.

Armstrong et al., "Synthesis of Layered LiMnO$_2$ as an Electrode for Rechargeable Lithium Batteries", *Nature*, vol. 381, pp. 499–500 Jun. (1996).

Murphy et al., "Ternary Li$_x$TiO$_2$ Phases from Insertion Reactions", *Solid State Ionics*, vols. 9 and 10, pp. 413–417 (1983). Month N/A.

Reimers et al., "Structure and Electrochemistry of Li$_x$Fe$_y$Ni$_{1-y}$O$_2$", *Solid State Ionics*, vol. 61, pp. 335–344 (1993). Dec. 1992.

Tarascon et al., "Li Metal–Free Rechargeable Batteries Based on Li$_{1+x}$Mn$_2$O$_4$ Cathodes ($0 \leq x \leq 1$) and Carbon Anodes", *J. Electrochem. Soc.*, vol. 138, pp. 2864–2868 Oct. (1991).

(List continued on next page.)

*Primary Examiner*—Mark L. Bell
*Assistant Examiner*—Patricia L. Hailey
*Attorney, Agent, or Firm*—Daniel R. Pastirik

[57] ABSTRACT

A compound having the formula Li$_q$Cr$_{x-y}$Ni$_y$Mn$_{2-x}$O$_{4+z}$ where $q \geq 2$, $1.0 \leq x \leq 1.25$, $0 < y < 0.9$, and $z \geq 0$. The invention also features an electrode composition containing this compound and processes for preparing a compound having the formula Li$_q$Cr$_{x-y}$Ni$_y$Mn$_{2-x}$O$_{4+z}$ where $q \geq 2$, $1.0 \leq x \leq 1.25$, $0 < y < 0.9$, and $z \geq 0$.

27 Claims, 6 Drawing Sheets

OTHER PUBLICATIONS

Hewston et al., "A Survey of First–Row Ternary Oxides LiMO$_2$ (M=Sc–Cu)", *J. Phys. Chem. Solids*, vol. 48, pp. 97–108 (1987). Jun. 1986.

Rossen et al., "Structure and Electrochemistry of Li$_x$M-n$_y$Ni$_{1-y}$O$_2$", *Solid State Ionics*, vol. 57, pp. 311–318 Apr. (1992).

Rossen et al., "Synthesis and Electrochemistry of Spinel LT–LiCoO$_2$", *Solid State Ionics*, vol. 62, pp. 53–60 (1993). Dec. 1992.

Wiles et al., "A New Computer Program for Rietveld Analysis of X–ray Powder Diffraction Patterns", *J. Appl. Cryst.*, vol. 14, pp. 149–151 (1981). Oct. 1980.

Dahn et al., "Mechanisms for Lithium Insertion in Carbonaceous Materials", *Science*, 270:590–593 (Oct. 1995).

Liu et al., "Mechanism of Lithium Insertion In Hard Carbons Prepared by Pyrolysis of Epoxy Resins", *Carbon*, 34(2):193–200 (1996). Sep. 1995.

Takahashi et al., "Characteristics of Disordered Carbon Materials as Negative Electrodes for Lithium Rechargeable Batteries", 35th Battery Symposium in Japan, Nov. 14–16, Nugoya (1994) Abstract. Month N/A.

Sonobe et al., "Development of Carbon Materials as Anode Material for Lithium Ion Secondary Battery", 35th Battery Symposium in Japan, Nov. 14–16, Nugoya (1994) Abstract. Month N/A.

Fitzer et al., "The Formation of Glasslike Carbon by Pyrolysis of Polyfurfuryl Alcohol and Phenolic Resin", *Carbon*, 7:643–648. Apr. 1969.

Zheng et al., "High–Capacity Carbons Prepared from Phenolic Resin for Anodes of Lithium–Ion Batteries", *J. Electrochem. Soc.*, 142(11):L211–L214 (Nov. 1995).

Xing et al., "Correlation Between Lithium Intercalation Capacity and Microstructure in Hard Carbons", *J. Electrochem. Soc.*, 143(11):3482–3491 (Nov. 1996).

Xing et al., "Optimizing Pyrolysis of Sugar Carbons for Use as Anode Materials in Lithium–Ion Batteries", *J. Electrochem. Soc.*, 143(10):3046–3052 (Oct. 1996).

Zheng et al., "Carbons Prepared From Coals for Anodes of Lithium–Ion Cells", *Carbon*, 34(12):1501–1507 (1996).

Peled, "The Electrochemical Behavior of Alkali and Alkaline Earth Metals in Nonaqueous Battery Systems—The Solid Electrolyte Interphase Model", *J. Electrochem. Soc.*, 126(12):2047–2051 (Dec. 1979).

Fong et al., "Studies of Lithium Intercalation into Carbons Using Nonaqueous Electrochemical Cells", *J. Electrochem. Soc.*, 137(7):2009–2013 (Jul. 1990).

Xing et al., "Study of Irreversible Capacities for Li Insertion in Hard and Graphitic Carbons", *J. Electrochem. Soc.*, 144(4):1195–1201 (Apr. 1997).

Matsumura et al., "Mechanism Leading to Irreversible Capacity Loss in Li Ion Rechargeable Batteries", *J. Electrochem. Soc.*, 142(9):2914–2918 (Sep. 1995).

International Search Report for International Application No. PCT/US98/03289.

Patent Abstracts of Japan, vol. 016, No. 112(E–1180), Mar. 19, 1992 and JP 03 285262 A. (Matsushita Electric and Co. Ltd., Dec. 16, 1991.

V. Todorov: A New Ni and Cr Doped Spinel Related 4.8V Cathode Material for Li and Li–Ion Batteries, vol. 97, No. 18, 1997, pp. 176–184, XP002068318. No month.

NICKEL— CONTAINING COMPOUNDS USEFUL AS ELECTRODES AND METHOD FOR PREPARING SAME

BACKGROUND OF THE INVENTION

This invention relates to preparing compounds useful as electrode compositions for lithium-ion batteries.

Lithium-ion batteries typically feature a pair of electrodes, at least one of which contains lithium in the form of a lithium-transition metal oxide. These batteries offer the advantages of high energy storage capacity and rechargeability. For optimum performance, it is desirable to maximize electrode capacity between cutoff voltages in the range of about 2.5V to about 4.2V versus lithium metal.

SUMMARY OF THE INVENTION

In a first aspect, the invention features a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$. The invention also features an electrode composition that includes this compound. In preferred embodiments, $2.0 \leq q \leq 2.5$, $x \geq 1.0$ and $0 < y \leq 0.6$, more preferably $x \geq 1.0$ and $0 < y \leq 0.2$. In other preferred embodiments, $x \leq 1.25$ and $0 < y \leq 0.9$, more preferably $x \leq 1.25$ and $0 < y \leq 0.8$ or $x \leq 1.25$ and $0 < y \leq 0.4$.

In a second aspect, the invention features a process for preparing a compound that includes the steps of (a) preparing a solution that includes (i) a chromium source, (ii) a nickel source, (iii) a manganese source, (iv) a lithium source, and (v) an oxygen source, the relative amounts of each of the sources being selected to yield, following step (c), a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$; (b) treating the solution to form a gel; and (c) heating the gel under an inert atmosphere for a time and at a temperature sufficient to yield a compound having the formula $Li_qCr_{x-y}Ni_yMn_{2-x}O_{4+z}$ where $q \geq 2$, $1.0 \leq x \leq 1.25$, $0 < y < 0.9$ and $z \geq 0$.

In preferred embodiments, the gel is heated at a temperature less than about 900° C., preferably no greater than about 800° C., and more preferably between about 500° C. and about 800° C. The solution preferably is an aqueous solution. The gel is preferably formed by treating the solution with ammonium hydroxide.

The chromium, nickel, manganese, lithium, and oxygen sources may be in the form of four separate materials, or in the form of a material that combines two or more of these elements. For example, the chromium source preferably is a compound consisting essentially of chromium and at least one additional element selected from the group consisting of oxygen, nitrogen, carbon, and hydrogen. Examples of such chromium sources include chromium oxide and chromium salts such as chromium nitrate. Chromium nitrate acts as a source of both chromium and oxygen. The nickel source preferably is a compound consisting essentially of nickel and at least one additional element selected from the group consisting of oxygen, nitrogen, carbon, and hydrogen. Examples of such nickel sources include nickel oxide and nickel salts such as nickel nitrate. Similarly, the manganese source preferably is a compound consisting essentially of manganese and at least one additional element selected from the group consisting of oxygen, nitrogen, carbon, and hydrogen. Examples include manganese carbonate and manganese salts such as manganese acetate. Similar to the case of chromium nitrate, manganese acetate acts as a source of both manganese and oxygen. The lithium source preferably is a compound consisting essentially of lithium and at least one additional element selected from the group consisting of oxygen, nitrogen, carbon, and hydrogen. An example is a lithium salt such as lithium hydroxide, a material which acts as a source of both lithium and oxygen.

According to one embodiment, the chromium, nickel, manganese, lithium, and oxygen sources are selected to yield, following step (c), a compound having the formula $Li_qCr_{x-y}Ni_yMn_{2-x}O_{4+z}$ where $q \geq 2$, $1.0 \leq x \leq 1.25$, $0 < y < 0.9$ and $z \geq 0$. In another embodiment, the chromium, nickel, manganese, lithium, and oxygen sources are selected to yield, following step (c), a compound having the formula $Li_qCr_{x-y}Ni_yMn_{2-x}O_{4+z}$ where $q \geq 2$, $x \leq 1.25$ and $0 < y < 0.8$ or $x \leq 1.25$ and $0 < y \leq 0.4$, and $z \geq 0$. In another embodiment, the chromium, nickel, manganese, lithium, and oxygen sources are selected to yield, following step (c), a compound having the formula $Li_qCr_{x-y}Ni_yMn_{2-x}O_{4+z}$ where $q \geq 2$, $x \geq 1.0$, $0 < y \leq 0.6$, and $z \geq 0$, more preferably $x \geq 1.0$ and $0 < y \leq 0.2$.

In another embodiment, the invention features a process for preparing a compound that includes the steps of (a) combining (i) a chromium source, (ii) a nickel source, (iii) a manganese source, (iv) a lithium source, and (v) an oxygen source, the relative amounts of each of the sources being selected to yield, following step (c), a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$; (b) grinding the mixture to form a substantially homogenous powder; and (c) heating the powder under an inert atmosphere for a time and at a temperature sufficient to yield a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$.

In preferred embodiments, the homogenous powder is heated at a temperature less than about 1000° C., preferably no greater than about 900° C., and more preferably between about 700° C. and about 900° C.

In a third aspect, the invention features a lithium ion battery that includes: (a) a first electrode that includes a compound having the formula $Li_qCr_{x-y}Ni_yMn_{2-x}O_{4+z}$ where $q \geq 0$, $1.0 \leq x \leq 1.25$, $0 < y < 0.9$, and $z \geq 0$, (b) a second electrode; and (c) an electrolyte, in which the first electrode has a reversible specific capacity of at least 100 mAh/g in the range 2.5V–4.2V vs. lithium metal when discharged at a rate corresponding to full discharge in 10 hours or less.

The invention provides compounds useful as electrode compositions (e.g., cathode compositions) for lithium-ion batteries. The electrode compositions exhibit good performance, as measured, e.g., by reversible and irreversible specific capacity in the range 2.5V–4.2V vs. lithium metal, and small charge-discharge polarization. Lithium-ion batteries incorporating such electrode compositions may be repeatedly cycled without substantial loss of performance.

The compounds are prepared using a sol-gel process that proceeds under relatively mild conditions (e.g., at temperatures preferably less than about 1000° C.) and requires relatively short reaction times (e.g., on the order of 10–24 hours). Alternatively, the compounds are prepared using a solid-state process, which is well suited to industrial scale synthesis.

Other features and advantages of the invention will be apparent from the following description of the preferred embodiments thereof, and from the claims.

DESCRIPTION OF THE PREFERRED EMBODIMENTS

Figure 1:
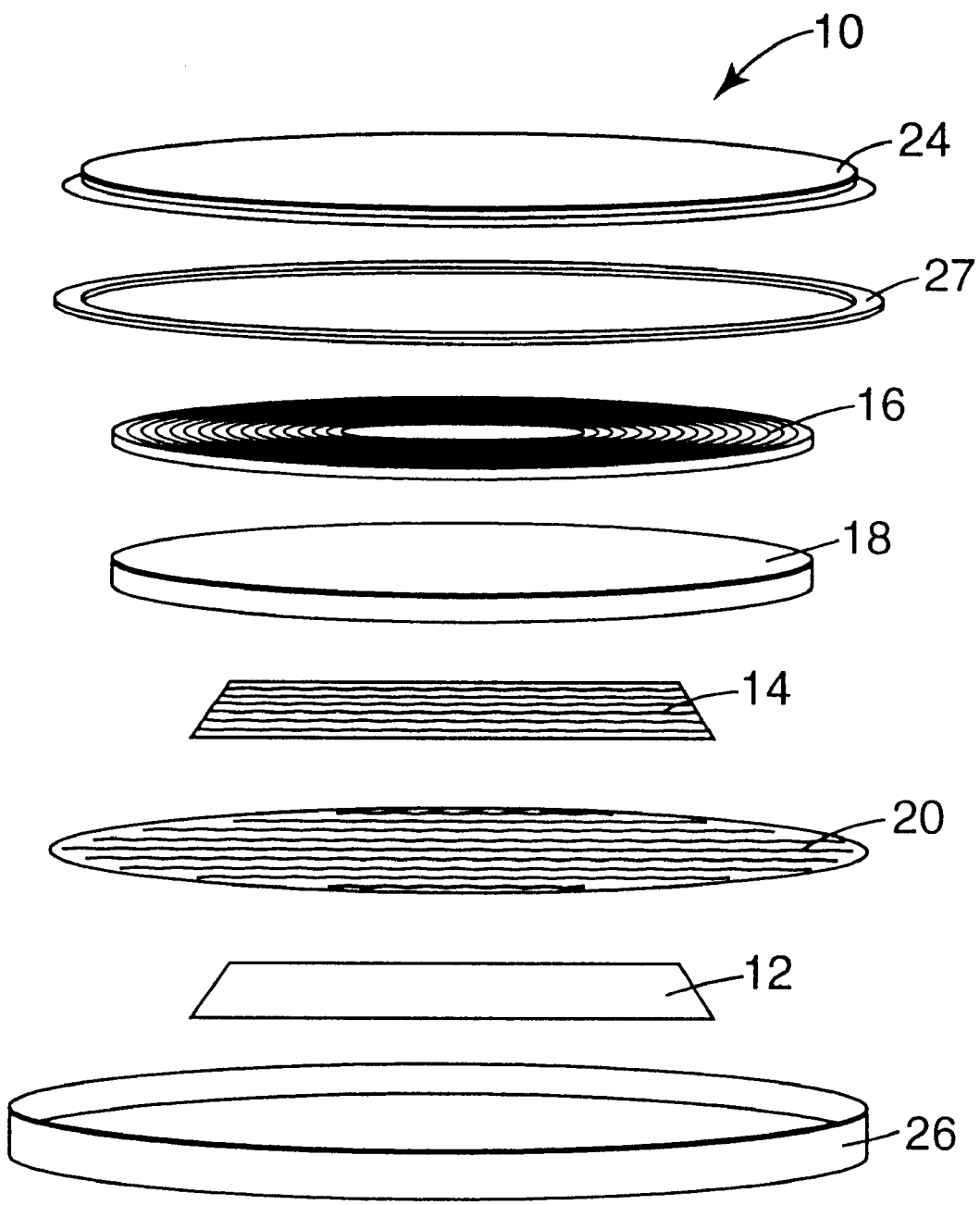
FIG. 1 is an exploded perspective view of an electrochemical cell used to test various electrode compositions.

Lithium-chromium-nickel-manganese oxides described herein have the general formula $Li_qCr_{x-y}Ni_yMn_{2-x}O_{4+z}$ where $q \geq 2$, $1.0 \leq x \leq 1.25$, $0 < y < 0.9$, and $z \geq 0$. These oxides are particularly useful as electrode compositions for lithium-ion batteries. They are preferably prepared in a sol-gel process in which chromium, lithium, nickel, manganese, and oxygen sources are combined to form a solution (preferably an aqueous solution), which is then converted to a gel by the addition of a reagent such as ammonium hydroxide ($NH_4OH$). The gel is then heated under an inert atmosphere (e.g., an argon atmosphere) to convert the gel to the desired oxide. Alternatively, these oxides are prepared in a solid-state reaction process in which lithium, chromium, nickel, manganese, and oxygen sources are mixed together (e.g., in an automatic grinder) to form a powder and then heated under an inert atmosphere.

A variety of materials may be used as the chromium, lithium, nickel, manganese, and oxygen sources. When the oxides are prepared in a sol-gel process, the chromium, lithium, nickel, manganese, and oxygen materials must be soluble in the medium used to prepare the gel. For example, in the case of aqueous solutions, the chromium, lithium, nickel, manganese, and oxygen sources must be water-soluble. A single material may serve as a source for more than one of these elements.

Preferred materials are those in which the elemental constituents (with the exception of chromium, lithium, nickel, manganese, and at least some of the oxygen) form volatile by-products during the heating step such that these elemental constituents do not become part of the final oxide product. The resulting oxide product, therefore, contains only lithium, chromium, nickel, manganese, and oxygen as its elemental constituents. In this way, the oxide product is essentially free of impurities which might otherwise compromise electrode performance.

Examples of suitable materials include nitrogen-containing compounds (which can liberate nitrogen-containing gas during heating), carbon-containing compounds (which can liberate, e.g., carbon dioxide and/or carbon monoxide during heating), and hydrogen-containing compounds (which can liberate, e.g., water vapor during heating). Specific examples include nitrates, hydroxides, and esters of organic acids such as acetates, citrates, tartrates, and oxalates.

The heating temperature and stoichiometric ratios of reactants determine the crystal structure (and associated parameters such as lattice constants and unit cell volume) of the oxide product, as well as whether the product is a single or multi-phase material. In general, for the sol-gel processes, temperatures less than 900° C. are preferred, with temperatures in the range 500°–800° C. being particularly preferred. For the solid-state processes, temperatures less than 1000° C. are generally preferred, with temperatures in the range of about 700° C. to about 900° C. being particularly preferred.

The invention will now be described further by way of the following examples.

EXAMPLES

ELECTROCHEMICAL CELL PREPARATION

Electrodes were prepared as follows. About 12 wt. % $Li_2Cr_{x-y}Ni_yMn_{2-x}O_{4+z}$ (prepared as described below), 6 wt. % Kynar Flex 2801 (a vinylidene fluoride-hexafluoropropylene copolymer commercially available from Atochem), 10 wt. % EC/PC (ethylene carbonate/propylene carbonate, 50/50 by volume), 1.5 wt. % Super S carbon black (commercially available from MMM Carbon, Belgium), and 70.5 wt. % acetone were thoroughly mixed by stirring in a sealed bottle at 50° C. for four hours to form a slurry. The slurry was then spread in a thin layer (about 150 micrometers thick) on a glass plate using a doctor blade spreader. After evaporating the acetone, the resulting film was peeled from the glass and a circular electrode measuring 1 cm in diameter was punched from the film using an electrode punch. The circular electrode was then weighed and the active mass (the total weight of the circular electrode multiplied by the fraction of the electrode weight made up by $Li_qCr_{x-y}Ni_yMn_{2-x}O_{4+z}$) was calculated, after which the circular electrode was sealed in a polyethylene bag with a heat sealer until used to assemble an electrochemical cell.

To assemble an electrochemical cell, each circular electrode was first placed in diethyl ether for about 5 minutes to remove EC/PC and form pores in the electrode that the electrolyte will fill during cell construction. The electrodes were then taken into an argon-filled glove box where the electrochemical cell was constructed.

An exploded perspective view of the electrochemical cell 10 is shown in FIG. 1. A stainless steel cap 24 and special oxidation resistant case 26 contain the cell and serve as the negative and positive terminals respectively. The cathode 12 was the electrode prepared as described above. The anode 14 was a lithium foil having a thickness of 125 micrometers; the anode also functioned as a reference electrode. The cell featured 2320 coin-cell hardware, equipped with a spacer plate 18 (304 stainless steel) and a disc spring 16 (mild steel). The disc spring was selected so that a pressure of about 15 bar would be applied to each of the cell electrodes when the cell was crimped closed. The separator 20 was a Celgard #2502 microporous polypropylene film (Hoechst-Celanese), which had been wetted with a 1M solution of $LiPF_6$ dissolved in a 30:70 volume mixture of ethylene carbonate and diethyl carbonate (Mitsubishi Chemical). A gasket 27 is used as a seal and also serves to separate the two terminals.

SOL-GEL SYNTHESIS

Example 1

63.692 g (0.158 moles) of $Cr(NO_3)_3.9H_2O$ (Aldrich Chemical Co., 99%), 8.926 g (0.030 moles) of $Ni(NO_3)_2.6H_2O$ (Aldrich Chemical Co., 99%), and 27.576 g (0.113 moles) of $Mn(CH_3COO)_2.4H_2O$ (Aldrich Chemical Co., 99%) were dissolved in 60 mls of distilled water to form a transition metal solution. In a separate beaker, 12.86 g (0.306 moles) of $LiOH.H_2O$ (FMC Corp., 98%) was dissolved in 70 mls of distilled water. While stirring, the LiOH solution was added dropwise to the transition metal solution over a period of about 10 minutes. Finally, about 26 mls of $NH_4OH$ was added dropwise over a period of about 10 minutes to form a gel. The gel was then placed in a "Fisher-Brand" muffle oven set to 180° C. to dry and solidify the gel overnight in air. After initial drying, the solidified gel was powdered in a Retsch model RM-O automatic grinder for about 15 minutes.

The powdered gel was then heated to 500° C. using a Lindberg tube furnace equipped with stainless steel furnace tubes and sealed end caps. After the gel had been loaded into the furnace tube, but before initiating heating, the end caps were sealed, and the furnace tube thoroughly purged with UHP-grade argon (Canadian Liquid Air), to remove unwanted air.

UHP-grade argon was passed at a rate of about 150 cc/min through fittings in the sealed end caps during the synthesis. The heating profile was as follows: 10° C./minute from 30° C. to 500° C., followed by a 10 hour soak at 500° C. under flowing argon. The sample was then cooled to room temperature in about three hours to yield a compound having the formula $Li_2Cr_{1.05}Ni_{0.2}Mn_{0.75}O_{4+z}$ where $z \geq 0$. The sample was then ground in an autogrinder for about 15 minutes and a 2.83 g sample was reloaded into a furnace tube, but before initiating heating, the end caps were sealed, and the furnace tube thoroughly purged with UHP-grade argon to remove unwanted air. The sample was then heated at 10° C./minute to a temperature of 700° C., followed by a 10 hour soak at 700° C. under flowing argon.

A powder x-ray diffraction pattern for the product was collected using a Siemens D5000 diffractometer equipped with a copper target X-ray tube and a diffracted beam monochromator. Data was collected between scattering angles of 10 degrees and 130 degrees.

The crystal structure was determined based upon the x-ray diffraction data as described in (a) C. J. Howard and R. J. Hill, Australian Atomic Energy Commission Report No. M112 (1986); and (b) D. B. Wiles and R. A. Young, J. Appl. Cryst., 14:149–151 (1981). The diffraction pattern of the sample can be fit by either of two "homeomorphic" crystal structures. These are the layered $LiCoO_2$-like structure with $c/a=(24)^{1/2}$ which gives Bragg peaks in the same positions and with the same powder intensities as the cubic spinel-related structure (space group Fd3m) with cations in 16c (Li) and 16d (Mn,Cr,Ni) positions. This structure will be designated "cub/hex." Material that exhibits the "layered $LiCoO_2$" will be designated "hex" here.

Lattice constants were determined using least squares refinements to the positions of calculated and measured Bragg peak positions, and were used to calculate unit volume according to the procedure described in standard x-ray diffraction texts, e.g., B. D. Warren, *X-Ray Diffraction*, Addison-Wesley, Reading, Mass. (1969). The unit volume refers to the volume of the crystal per formula unit of the material, the formula unit being $Li_qCr_{x-y}Ni_yMn_{2-x}O_{4+z}$. For the cub/hex structure indexed on the cubic spinel-related unit cell, the unit cell contains 8 formula units. For the cub/hex structure indexed on the hexagonal unit cell, the unit cell contains 3/2 formula units. For the hex structure, indexed on the hexagonal unit cell, the unit cell contains 3/2 formula units.

The lattice constants and unit volume for the sample are set forth in Table 1. The calculated values were obtained assuming a layered structure with space group R-3M. The lattice constants used were a=2.895 Å and c=14.190 Å.

Example 1 had a hex structure, with nickel placed randomly at the same crystallographic sites as manganese and chromium.

An electrochemical cell was constructed according to the above-described procedure using the material of Example 1 as the cathode. The cell was cycled between voltage limits of 2.5V and 4.2V using a current of 15 mA/g. Reversible and irreversible capacities were determined and are reported in Table 1.

Comparative Example 1

50.524 g (0.125 moles) of $Cr(NO_3)_3 \cdot 9H_2O$ (Aldrich Chemical Co., 99%) and 18.38 g (0.075 moles) of $Mn(CH_3COO)_2 \cdot 4H_2O$ (Aldrich Chemical Co.) were dissolved in 80 mls of distilled water to form a transition metal solution. In a separate beaker, 8.564 g (0.2 moles) of $LiOH \cdot H_2O$ (FMC Corp., 98%) was dissolved in 70 mls of distilled water. While stirring, the LiOH solution was added dropwise to the transition metal solution over a period of about 5 minutes. The solution was stirred for about 15 minutes. Finally, about 10 mls of $NH_4OH$ was added dropwise over about 5 minutes to form a gel. The gel was then placed in a "Fisher-Brand" muffle oven set to 170° C. to dry and solidify the gel overnight in air. After initial drying, the solidified gel was powdered in a Retsch model RM-O automatic grinder for about 10 minutes.

The powdered gel was then heated to 500° C. using a Lindberg tube furnace equipped with stainless steel furnace tubes and sealed end caps. After the gel had been loaded into the furnace tube, but before initiating heating, the end caps were sealed, and the furnace tube thoroughly purged with UHP-grade argon (Canadian Liquid Air), to remove unwanted air.

UHP-grade argon was passed at a rate of about 150 cc/min through fittings in the sealed end caps during the synthesis. The heating profile was as follows: from 30° C. to 150° C. in 20 minutes, followed by a 3 hour soak at 150° C. The sample was then heated to 500° C. in 40 minutes, soaked for 10 hours, and cooled to room temperature in about one hour to yield a compound having the formula $Li_2Cr_{1.25}Mn_2O_{4+z}$ where $z \geq 0$.

A 2 gram sample of the powdered material was further subjected to a heat treatment in the furnace for 24 hours at 700° C. The crystal structure, lattice constants, and unit cell volume were determined as described in Example 1 and are reported in Table 1.

An electrochemical cell was constructed according to the above-described procedure using the material of Comparative Example 1 as the cathode. The cell was cycled between voltage limits of 2.5V and 4.2V using a current of 15 mA/g. Reversible and irreversible capacities were determined and are reported in Table 1.

Figure 2:
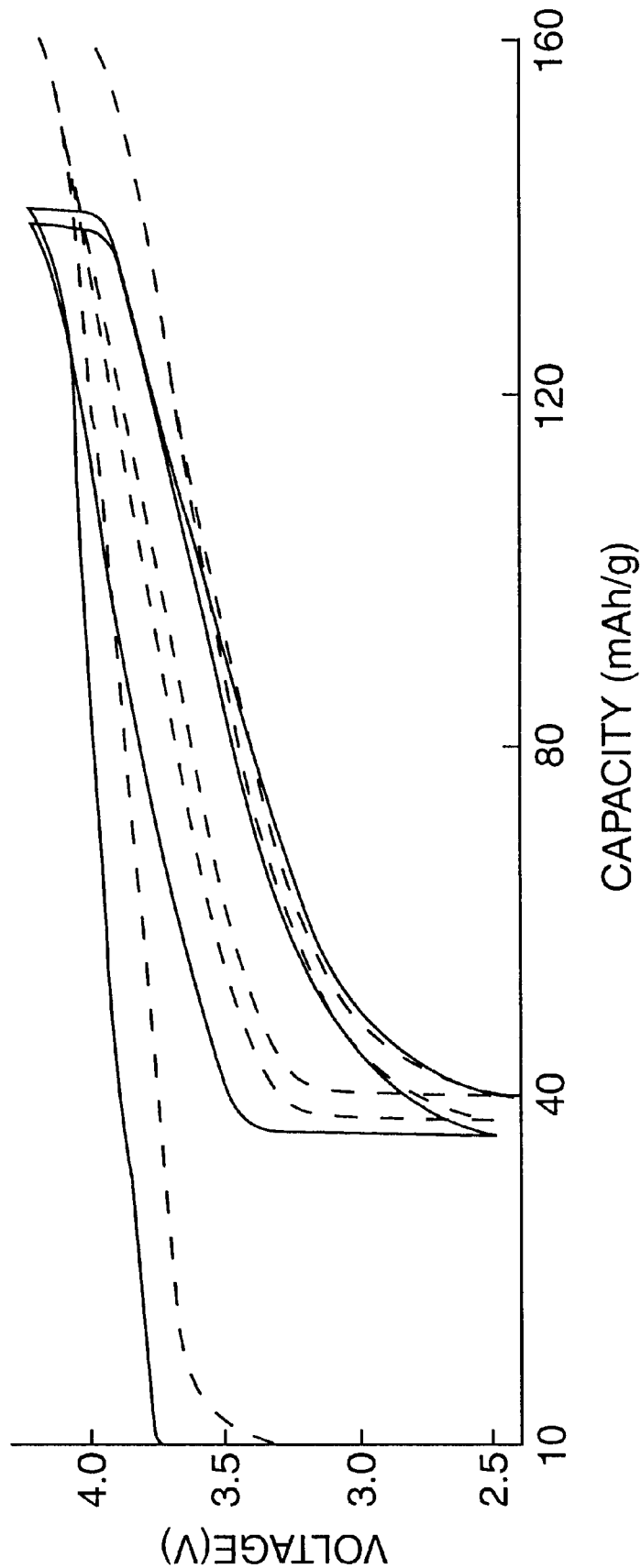
FIG. 2 is a plot of two voltage versus capacity profiles for the material prepared according to Comparative Example 1 and Example 1.

The voltage profile for a cell prepared using material from Comparative Example 1 and a cell prepared using material from Example 1 were obtained and are shown in FIG. 2. The voltage profile for Comparative Example 1 is represented by a solid line and the voltage profile for Example 1 is represented by a dashed line. These profiles demonstrate that Example 1 has an increased reversible capacity and a reduced charge-discharge polarization compared to Comparative Example 1.

Examples 2–7

Examples 2–7 were prepared following the procedure set forth in Example 1 except that the relative amounts of reactants ($Cr(NO_3)_3 \cdot 9H_2O$, $Ni(NO_3)_2 \cdot 6H_2O$, $Mn(CH_3COO)_2 \cdot 4H_2O$, and $LiOH \cdot H_2O$) were selected to yield a product having the formula $Li_2Cr_{0.85}Ni_{0.4}Mn_{0.75}O_{4+z}$ where $z \geq 0$. The procedure of Example 1 was followed up to the point of soaking the material at 500° C. for 10 hours and cooling it to room temperature. A portion of this material was saved for further use and is referred to as Example 3.

Five 2 gram samples of the powdered material were further subjected to a heat soak treatment in the furnace for 10 hours at the following temperatures: 700° C. (Example 2), 600° C. (Example 4), 800° C. (Example 5), 900° C. (Example 6), and 1000° C. (Example 7). In the case of samples prepared above 700° C., quartz furnace tubes were used. In all cases nickel randomly substitutes for chromium and manganese on the same crystallographic sites.

The crystal structure, lattice constants, and unit volume were determined for each sample according to the procedure in Example 1. The results are summarized in Table 1.

Several electrochemical cells were constructed according to the procedure described above using, as the cathode, samples prepared according to Examples 2–7. Specifically, six cells were prepared using the material of Examples 2–7 and cycled between voltage limits of 2.5V and 4.2V using currents of 15 mA/g. Reversible and irreversible capacities were determined and the results are reported in Table 1.

Figure 3:
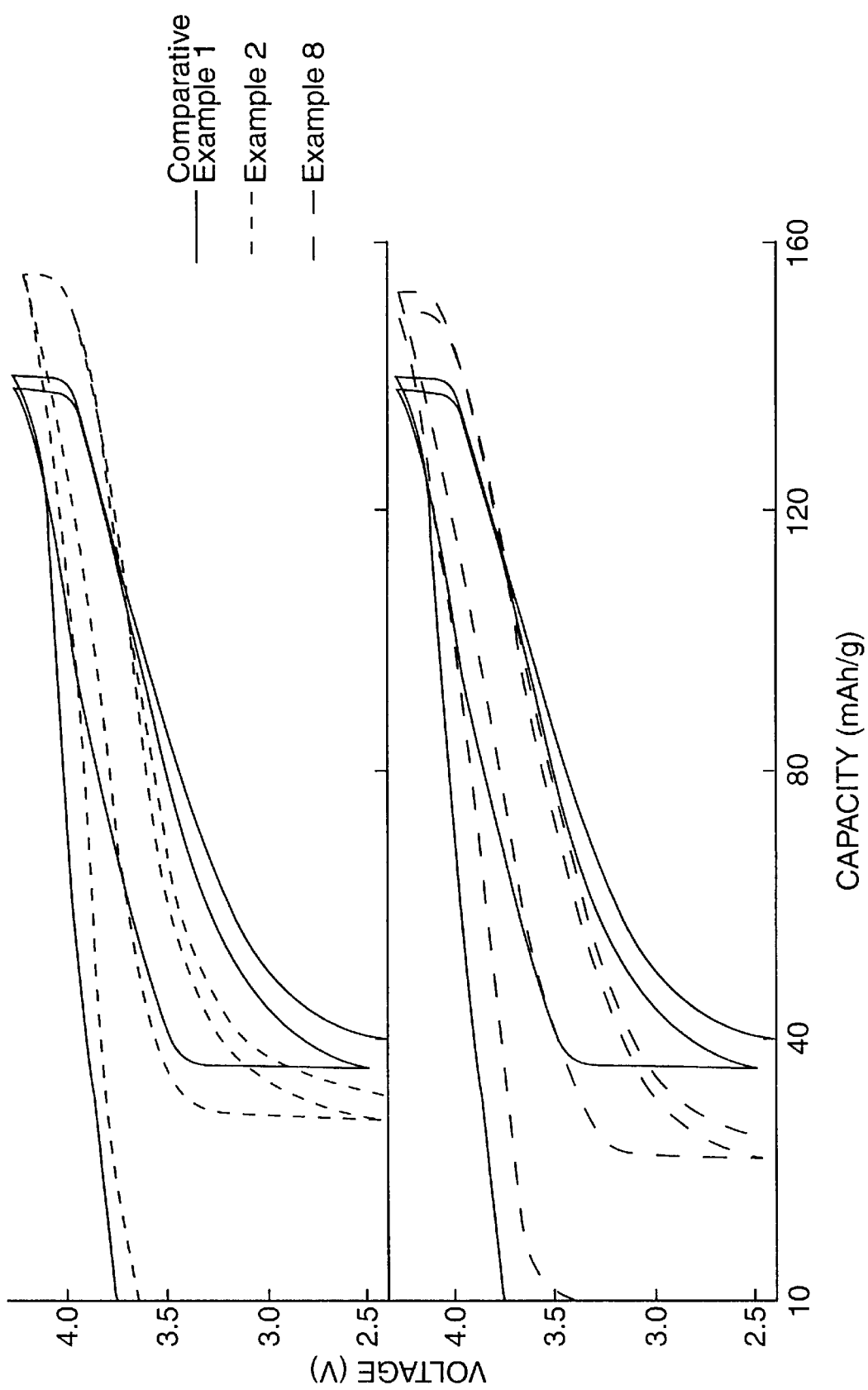
FIG. 3 is a plot of a series of voltage versus capacity profiles for the materials prepared according to Comparative Example 1 and Examples 2 and 8.

The voltage profiles for cells prepared using material from Comparative Example 1 (solid line) and Example 2 (dashed line) were obtained and are shown in the lower plot of FIG. 3. These profiles demonstrate that Example 2 has an increased capacity, a reduced irreversible capacity, and a reduced charge-discharge polarization compared to Comparative Example 1.

Figure 4:
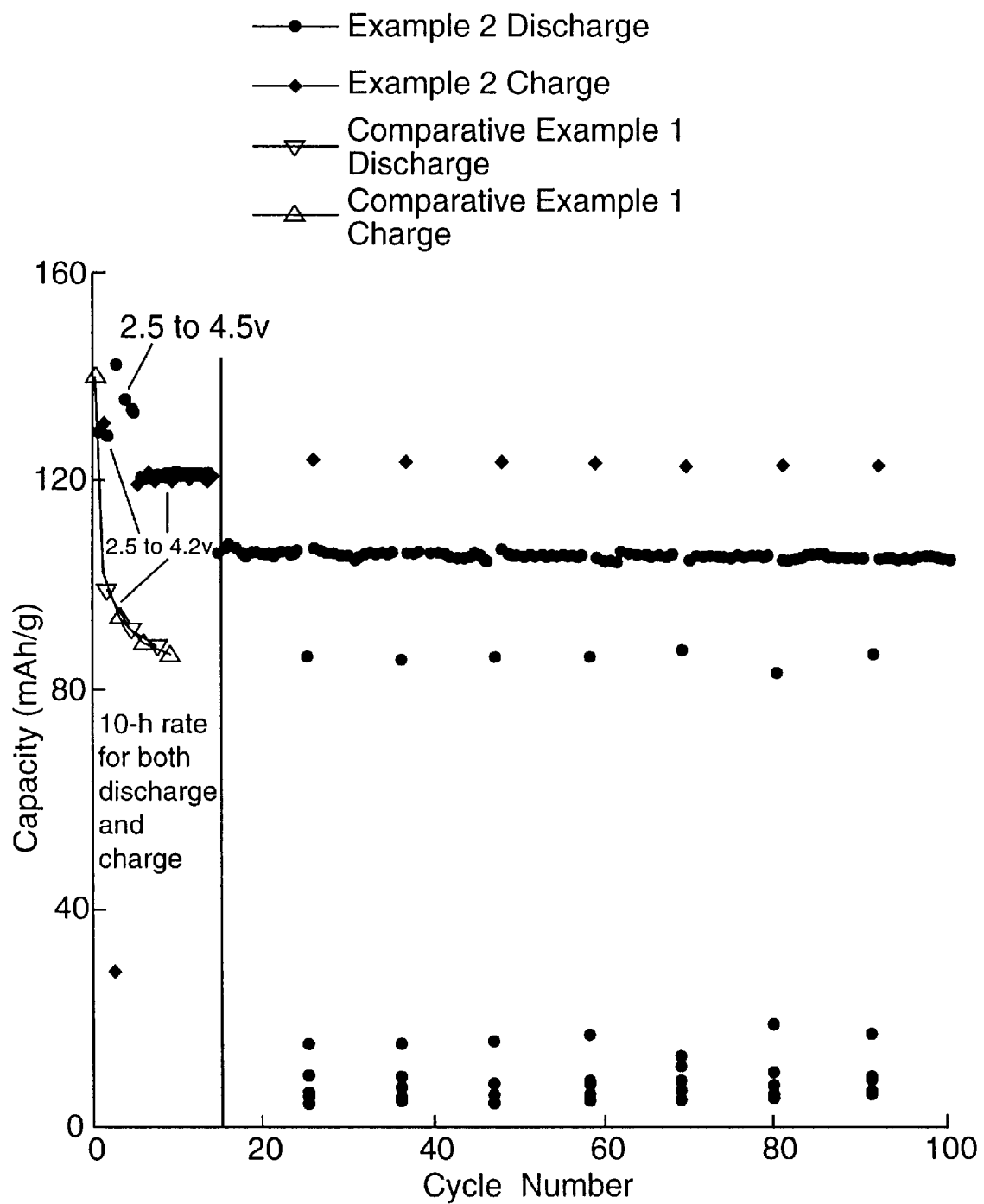
FIG. 4 is a plot of capacity versus cycle number for Comparative Example 1 and Example 2.

In FIG. 4, capacity versus cycle number of Example 2 is shown. A cell prepared using material from Comparative Example 1 was subjected to 11 cycles during which the cell was charged and discharged between 2.5V and 4.5V with a current of 15 mA/g. For Comparative Example 1, capacity upon charge is represented by open triangles and capacity upon discharge is represented by inverted triangles. For Example 2, capacity upon charge is represented by solid diamonds and capacity upon discharge is represented by solid circles. For the 11 cycles of Comparative Example 1 and the first 15 cycles of Example 2, charge and discharge occurred over a period of 10 hours. The cycling profile for Example 2 was as follows: between 2.5V and 4.2V (cycles 1 and 2); between 2.5V and 4.5V (cycles 3 and 4); and between 2.5V and 4.2V (cycles 5 through 100). For the remaining cycles (16–100) the cell of Example 2 was discharged with a current of 50 mA/g and charged with a current of 15 mA/g. At every 10th cycle the cell was subjected to a 150 mA/g "C-rate" discharge current. The C-rate discharge was followed by the successive discharge of the cell with the following currents: 75 mA/g, 37.5 mA/g, 18.75 mA/g, 9.375 mA/g, and 4.687 mA/g. Following the C-rate discharge, the cell was charged with a current of 15 mA/g. The data are shown in FIG. 4 and demonstrate excellent capacity retention and cycle-life.

Example 8

Example 8 was prepared following the procedure set forth in Example 2 except that the relative amounts of reactants were selected to yield a product having the formula $Li_2Cr_{0.45}Ni_{0.8}Mn_{0.75}O_{4+z}$ where $z \geq 0$.

The crystal structure, lattice constants, and unit volume were determined for each sample according to the procedure in Example 1. The results are summarized in Table 1.

An electrochemical cell was constructed according to the procedure described above using, as the cathode, material prepared according to Example 8. The cell cycled between voltage limits of 2.5V and 4.2V using currents of 15 mA/g. Reversible and irreversible capacities were determined and the results are reported in Table 1.

The voltage profiles for cells prepared using material from Comparative Example 1 (solid line) and Example 8 (dashed line) were obtained and are shown in the upper plot of FIG. 3. These profiles show that Example 8 has an increased reversible capacity and a reduced irreversible capacity compared to Comparative Example 1. In addition, Example 8 has a reduced charge-discharge polarization compared to Comparative Example 1. The data indicate that the increased nickel content reduces the charge-discharge polarization.

Example 9

7.688 g nickel acetate tetrahydrate (Aldrich Chemical Co., 99%), 36.78 g $Mn(CH_3COO)_2.4H_2O$, and 48.537 g $Cr(NO_3)_3.9H_2O$ were dissolved in 60 mls of distilled water to form a transition metal solution. In a separate beaker, 12.91 g $LiOH.H_2O$ was dissolved in 70 mls of distilled water. While stirring, the LiOH solution was added dropwise to the transition metal solution over a period of about 10 minutes. Finally about 70 mls of $NH_4OH$ were added dropwise over a period of about 10 minutes to form a gel. The gel was then subjected to the same procedure as described above in Example 1 except that after heating to 500° C. the material was subjected to a 16 hour soak at 500° C. under flowing argon. The sample was then cooled to room temperature in about 3 hours to yield a compound having the formula $Li_2Cr_{0.80}Ni_{0.2}Mn_{1.0}O_{4+z}$ where $z \geq 0$. The sample was then ground in an automatic grinder for about 15 minutes and a 2.90 g sample was reloaded into a furnace tube, but before initiating heating, the end caps were sealed, and the furnace tube thoroughly purged with UHP-grade argon to remove unwanted air. The sample was then heated at 10° C./minute to a temperature of 700° C., followed by a 10 hour soak at 700° C. under flowing argon.

The crystal structure, lattice constants, and unit volume were determined for the sample according to the procedure in Example 1. The results are summarized in Table 1.

An electrochemical cell was constructed according to the above-described procedure using the material of Example 9 as the cathode. The cell was cycled between voltage limits of 2.5V and 4.2V using a current of 15 mA/g. Reversible and irreversible capacities were determined and are reported in Table 1.

Comparative Example 2

Comparative Example 2 was prepared following the procedure set forth in Comparative Example 1 except that the relative amounts of reactants $(Cr(NO_3)_3.9H_2O, Mn(CH_3COO)_2.4H_2O,$ and $LiOH.H_2O)$ were selected to yield a product having the formula $Li_2Cr_{1.0}Mn_{1.0}O_{4+z}$ where $z \geq 0$. A 2 gram sample of the powdered material was further subjected to a heat treatment in the furnace for 24 hours at 700° C. The crystal structure, lattice constants, and unit cell volume were determined as described in Example 1 and are reported in Table 1.

An electrochemical cell was constructed and cycled according to the procedure described in Example 1 except that material of Comparative Example 2 was used as the cathode. Reversible capacity was determined and is reported in Table 1.

SOLID STATE PROCESS

Examples 10–13

8.587 g $LiOH.H_2O$, 34.45 g $Cr(NO_3)_3.9H_2O$, 11.89 g $Ni(NO_3)_2.6H_2O$ and 8.666 g of $Mn(CH_3COO)_2.4H_2O$ were thoroughly mixed by grinding in an automatic grinder for about 15 minutes. The powdered material was placed in a muffle oven set to 110° C. to dry for 3 hours. The material was then heated to 500° C. for 15 hours under argon using the procedures set forth in Example 1 to yield a compound having the formula $Li_2Cr_{0.85}Ni_{0.4}Mn_{0.75}O_{4+z}$ where $z \geq 0$.

Examples 10–13 were prepared following the procedure of Example 1 except that a 3 g sample of the material was further subjected to a heat treatment in the furnace for 15 hours at the following temperatures: 600° C. (Example 10), 700° C. (Example 11), 800° C. (Example 12) and 900° C. (Example 13).

Figure 5:
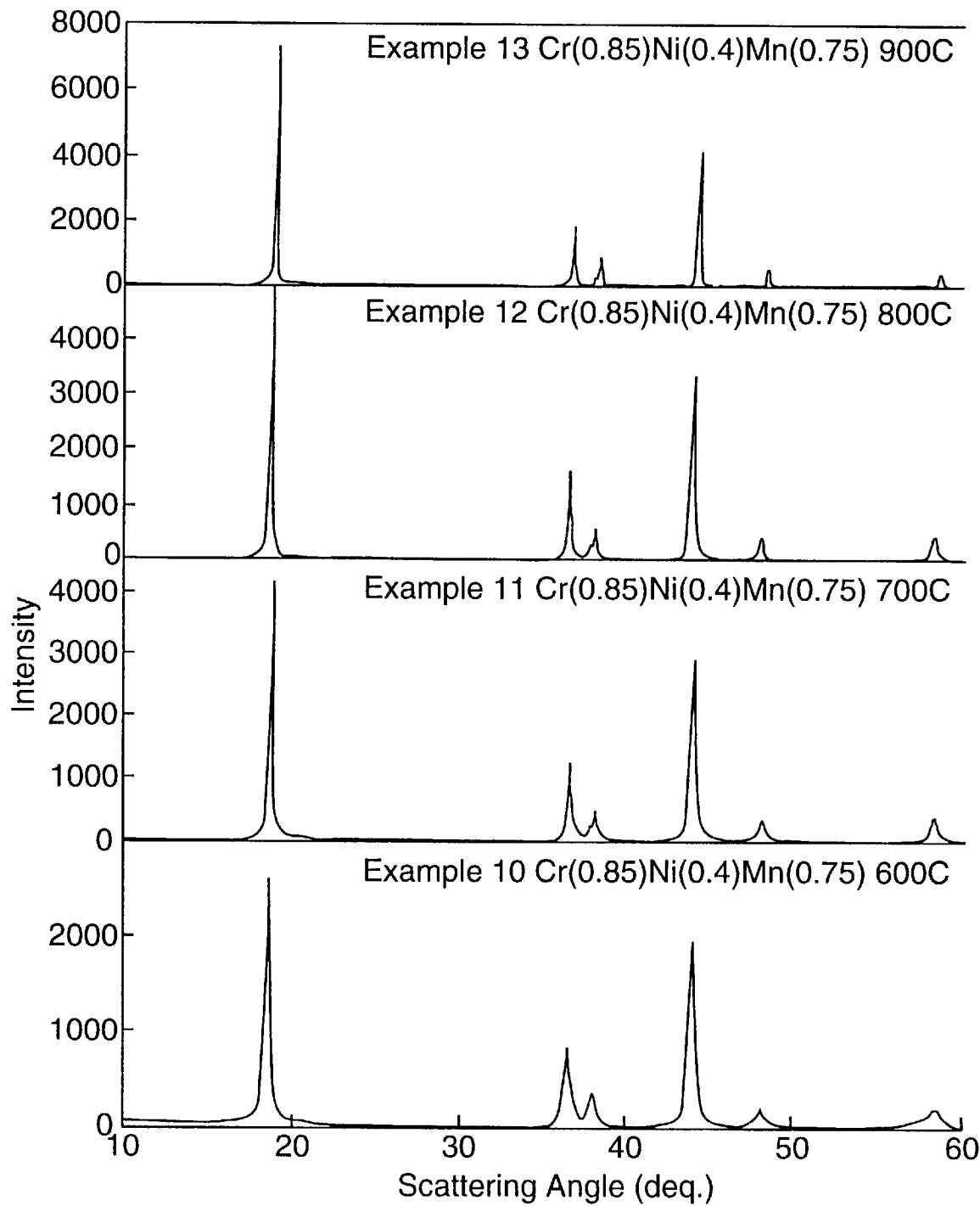
FIG. 5 is a series of x-ray diffraction profiles for materials prepared according to Examples 10–13.

Powder x-ray diffraction patterns were obtained for each sample and are shown in FIG. 5. The crystal structure, lattice constants, and unit volume were determined as described in Example 1, and are reported in Table 1.

Figure 6:
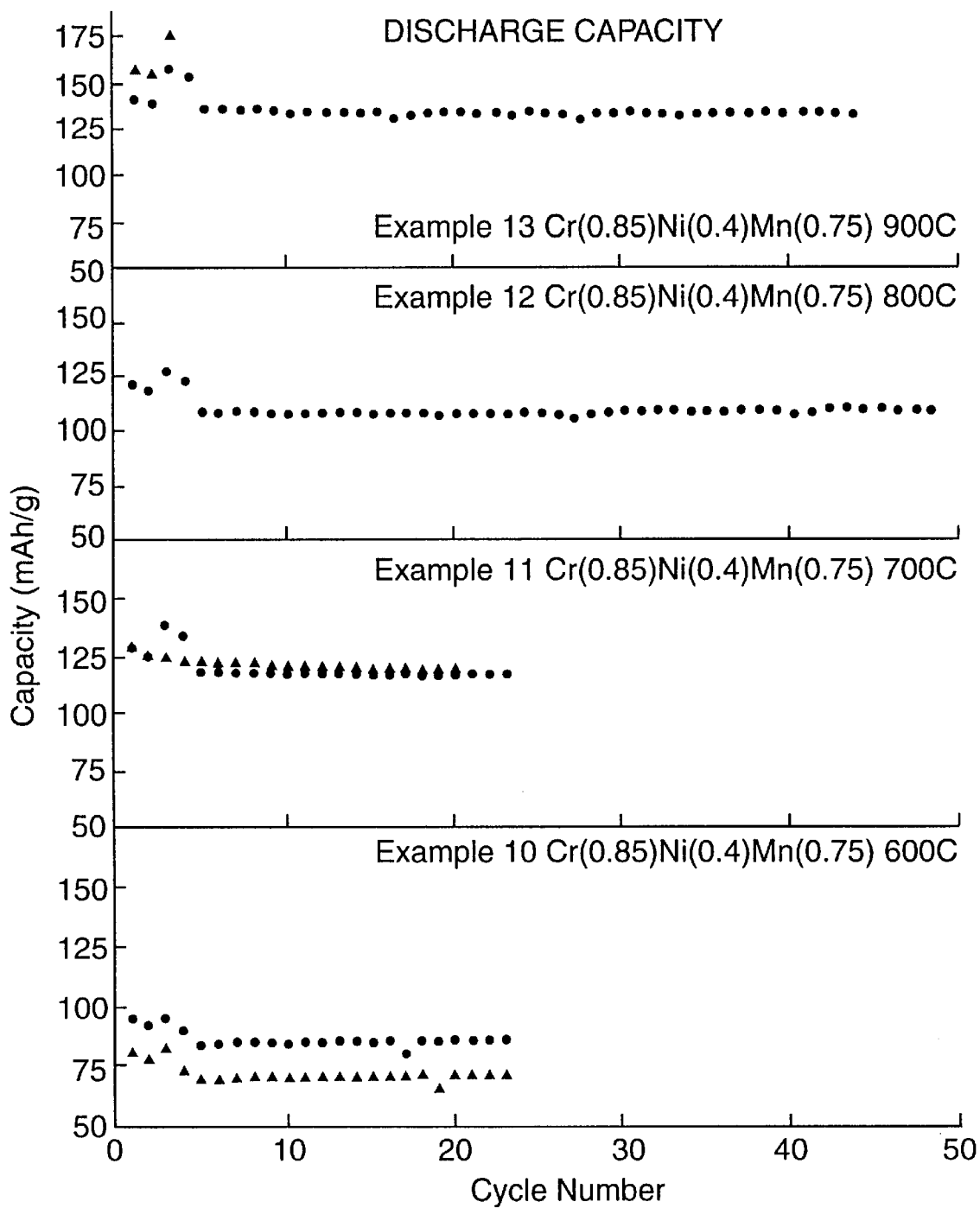
FIG. 6 is a series of plots showing discharge capacity versus cycle number for Examples 10–13.

Electrochemical cells were constructed as described above using the materials of Examples 10–13 and cycled with a current of 15 mAh/g as follows: between 2.5V and 4.2V for charge-discharge cycles 1 and 2, between 2.5V and 4.5V for charge-discharge cycles 3 and 4, and between 2.5V and 4.2V for the remaining charge-discharge cycles. The resulting discharge capacity versus cycle number is shown in FIG. 6. The solid triangles and circles represent two cells made from the same material and subjected to the same test conditions. For Examples 11 and 13, cycling of the cell represented by triangles was terminated prior to terminating the cycling of the cell represented by circles. The data demonstrate excellent cycling behavior. Reversible and irreversible capacities for each of these cells were determined and are reported in Table 1.

Example 14

17.143 g $LiOH.H_2O$, 12.937 g $Cr_2O_3$ (Aldrich Chemical Co.), 6.003 g NiO (Aldrich Chemical Co.) and 17.277 g $MnCO_3$ (Aldrich Chemical Co., 99%) were thoroughly mixed by grinding in an automatic grinder for about 15 minutes. The mixture was heated to 500° C. for 15 hours under argon. The product was then powdered in an automatic grinder for 15 minutes and heated again at 500° C. for 15 hours under argon. The sample was then sequentially heated for 15 hours at each of the following temperatures: 700° C. under argon, 800° C. under air, and 900° C. under argon, to yield a compound having the general formula $Li_2Cr_{0.85}Ni_{0.4}Mn_{0.75}O_{4+z}$ where $z \geq 0$.

Example 14 was examined by x-ray diffraction and exhibited a diffraction pattern nominally the same as Example 13 with almost identical lattice constants.

The crystal structure, lattice constants, and unit volume was determined according to the procedure in Example 1. The results are summarized in Table 1.

Other embodiments are within the following claims.

What is claimed is:

1. A compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$.

2. The compound of claim 1 where $x \geq 1.0$ and $0 < y \leq 0.6$.
3. The compound of claim 1 where $x \geq 1.0$ and $0 < y \leq 0.2$.
4. The compound of claim 1 where $x \leq 1.25$ and $0 < y \leq 0.8$.
5. The compound of claim 1 where $x \leq 1.25$ and $0 < y \leq 0.4$.
6. A process for preparing a compound comprising the steps of:
   (a) preparing a solution comprising (i) a chromium source, (ii) a nickel source, (iii) a manganese source, (iv) a lithium source, and (v) an oxygen source,
   the relative amounts of each of said sources being selected to yield, following step (c), a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$.;
   (b) treating said solution to form a gel; and
   (c) heating said gel under an inert atmosphere for a time and at a temperature sufficient to yield a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$.

7. A process according to claim 6 comprising heating said gel at a temperature less than about 900° C.
8. A process according to claim 6 comprising heating said gel at a temperature no greater than about 800° C.
9. A process according to claim 6 comprising heating said gel at a temperature between about 500° C. and about 800° C.
10. A process according to claim 6 wherein said solution comprises an aqueous solution.
11. A process according to claim 6 comprising treating said solution with ammonium hydroxide to form said gel.
12. A process according to claim 6 wherein said chromium source comprises a compound consisting essentially of chromium and at least one additional element selected from the group consisting of oxygen, nitrogen, carbon, and hydrogen.
13. A process according to claim 6 wherein said chromium source comprises chromium nitrate.
14. A process according to claim 6 wherein said nickel source comprises a compound consisting essentially of nickel and at least one additional element selected from the group consisting of oxygen, nitrogen, carbon, and hydrogen.
15. A process according to claim 6 wherein said nickel source comprises nickel nitrate.
16. A process according to claim 6 wherein said manganese source comprises a compound consisting essentially of

TABLE 1

| Example | Stoichiometry | Method | Heating Temp. (°C.) | a(Å) | c(Å) | Volume (Å$^3$) | Structure type | Irrev. Cap. (mAh/g) @ 10 hr rate (2.5–4.2 V) | Rev. Cap. (mAh/g) @ 10 hr rate (2.5–4.2 V) |
|---|---|---|---|---|---|---|---|---|---|
| 1 | $Li_2Cr_{1.05}Ni_{0.2}Mn_{0.75}O_4$ | sol-gel | 700 | 2.9023 | 14.424 | 70.152 | hex | 35 | 120 |
| Comparative Example 1 | $Li_2Cr_{1.25}Mn_{0.75}O_4$ | sol-gel | 700 | 2.904 | 14.426 | 70.22 | hex | 37 | 106 |
| 2 | $Li_2Cr_{0.85}Ni_{0.4}Mn_{0.75}O_4$ | sol-gel | 700 | 2.9033 | 14.3289 | 69.735 | hex | 22 | 130 |
| 3 | $Li_2Cr_{0.85}Ni_{0.4}Mn_{0.75}O_4$ | sol-gel | 500 | 2.8936 | 14.2901 | 69.082 | cub/hex | 18 | 128 |
| 4 | $Li_2Cr_{0.85}Ni_{0.4}Mn_{0.75}O_4$ | sol-gel | 600 | 2.8951 | 14.329 | 69.341 | cub/hex | 25 | 140 |
| 5 | $Li_2Cr_{0.85}Ni_{0.4}Mn_{0.75}O_4$ | sol-gel | 800 | 2.907 | 14.409 | 70.305 | hex | 30 | 125 |
| 6 | $Li_2Cr_{0.85}Ni_{0.4}Mn_{0.75}O_4$ | sol-gel | 900 | 2.9117 | 14.426 | 70.612 | hex | 45 | 65 |
| 7 | $Li_2Cr_{0.85}Ni_{0.4}Mn_{0.75}O_4$ | sol-gel | 1000 | 2.9119 | 14.428 | 70.636 | hex | 65 | 30 |
| 8 | $Li_2Cr_{0.45}Ni_{0.8}Mn_{0.75}O_4$ | sol-gel | 700 | 2.8994 | 14.3397 | 69.600 | hex | 30 | 123 |
| 9 | $Li_2Cr_{0.8}Ni_{0.2}Mn_{1.0}O_4$ | sol-gel | 700 | 2.8939 | 14.3495 | 69.383 | hex | N/A | 132 |
| Comparative Example 2 | $Li_2Cr_{1.0}Mn_{1.0}O_4$ | sol-gel | 700 | 2.901 | 14.357 | 69.78 | hex | 15 | 110 |
| 10 | $Li_2Cr_{0.85}Ni_{0.4}Mn_{0.75}O_4$ | solid-state | 600 | 2.8983 | 14.3273 | 69.483 | hex | 40 | 90 |
| 11 | $Li_2Cr_{0.85}Ni_{0.4}Mn_{0.75}O_4$ | solid-state | 700 | 2.9031 | 14.378 | 69.960 | hex | 30 | 130 |
| 12 | $Li_2Cr_{0.85}Ni_{0.4}Mn_{0.75}O_4$ | solid-state | 800 | 2.9042 | 14.389 | 70.066 | cub/hex | 45 | 120 |
| 13 | $Li_2Cr_{0.85}Ni_{0.4}Mn_{0.75}O_4$ | solid-state | 900 | 2.9053 | 14.398 | 70.163 | hex | 30 | 140 |
| 14 | $Li_2Cr_{0.85}Ni_{0.4}Mn_{0.75}O_4$ | solid-state | 900 | 2.9057 | 14.406 | 70.222 | hex | N/A | N/A | manganese and at least one additional element selected from the group consisting of oxygen, nitrogen, carbon, and hydrogen.

17. A process according to claim 6 wherein said manganese source comprises manganese acetate.

18. A process according to claim 6 wherein said lithium source comprises a compound consisting essentially of lithium and at least one additional element selected from the group consisting of oxygen, nitrogen, carbon, and hydrogen.

19. A process according to claim 6 wherein said lithium source comprises lithium hydroxide.

20. A process according to claim 6 comprising selecting each of said sources to yield, following step (c), a compound having the formula $Li_qCr_{x-y}Ni_yMn_{2-x}O_{4+z}$ where $x \geq 1.0$ and $0 < y \leq 0.6$.

21. A process according to claim 6 comprising selecting each of said sources to yield, following step (c), a compound having the formula $Li_qCr_{x-y}Ni_yMn_{2-x}O_{4+z}$ where $x \geq 1.0$ and $0 < y \leq 0.2$.

22. A process according to claim 6 comprising selecting each of said sources to yield, following step (c), a compound having the formula $Li_qCr_{x-y}Ni_yMn_{2-x}O_{4+z}$ where $x \leq 1.25$ and $0 < y \leq 0.8$.

23. A process according to claim 6 comprising selecting each of said sources to yield, following step (c), a compound having the formula $Li_qCr_{x-y}Ni_yMn_{2-x}O_{4+z}$ where $x \leq 1.25$ and $0 < y \leq 0.4$.

24. A process for preparing a compound comprising the steps of:

(a) combining (i) a chromium source, (ii) a nickel source, (iii) a manganese source, (iv) a lithium source, and (v) an oxygen source, the relative amounts of each of said sources being selected to yield, following step (c), a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$;

(b) grinding said mixture to form a substantially homogenous powder; and (c) heating said powder under an inert atmosphere for a time and at a temperature sufficient to yield a compound having the formula $Li_qCr_{x-y}Ni_yMn_{2-x}O_{4+z}$ where $q \geq 2$, $1.0 \leq x \leq 1.25$, $0 < y < 0.9$, and $z \geq 0$.

25. A process according to claim 24 comprising heating said powder at a temperature less than about 1000° C.

26. A process according to claim 24 comprising heating said powder at a temperature no greater than about 900° C.

27. A process according to claim 24 comprising heating said powder at a temperature between about 700° C. and about 900° C.

* * * * *